United States Patent [19]

Mathur et al.

[11] Patent Number: 5,712,853
[45] Date of Patent: Jan. 27, 1998

[54] APPARATUS AND METHOD FOR TRANSFERRING OPERATION, ADMINISTRATION AND MANAGEMENT CELLS ACROSS AND ATM DATA FRAME USER NETWORK INTERFACE

[75] Inventors: Deepak Mathur, Waterbury, Conn.; Peter T. Marino, Raleigh, N.C.

[73] Assignee: General DataComm, Inc., Middlebury, Conn.

[21] Appl. No.: 526,846

[22] Filed: Sep. 11, 1995

[51] Int. Cl.$^6$ ............................................. H04J 3/16
[52] U.S. Cl. ........................ 370/467; 370/395; 370/474
[58] Field of Search .......................... 370/94.1, 60, 60.1, 370/68.1, 94.2, 110.1, 79, 58.2

[56] References Cited

U.S. PATENT DOCUMENTS

| | | | |
|---|---|---|---|
| 5,265,088 | 11/1993 | Takigawa et al. | 370/58.2 |
| 5,323,392 | 6/1994 | Ishii et al. | 370/94.1 |
| 5,420,858 | 5/1995 | Marshall et al. | 370/60.1 |
| 5,440,552 | 8/1995 | Sugita | 370/94.1 |
| 5,457,681 | 10/1995 | Gaddis et al. | 370/94.1 |
| 5,459,722 | 10/1995 | Sherif | 370/60.1 |
| 5,490,141 | 2/1996 | Lai et al. | 370/60.1 |

OTHER PUBLICATIONS

ITU-T Recommendation I-610 for "B-ISDN Operation and Maintenance Principles and Functions", Nov. 1994.
"Broadband ISDN Operations and Maintenance Principles and Functions", Draft American Nat'l Standard for Telecommunications.
"af-saa-0030 000 Frame User-to-Network Interface (FUNI) Specifications" ATM Forum Technical Committee, Mar. 15, 1995.
dpANS B-ISDN Operations and Maintenance Principles and Functions, Jul. 11-15, 1994, St. Louis, Committee, T1, T1S1.5/94-004 R1.

*Primary Examiner*—Wellington Chin
*Assistant Examiner*—Soon-Dong Hyun
*Attorney, Agent, or Firm*—David P. Gordon

[57] ABSTRACT

A method and switch appratus for transporting an ATM layer OAM cell across a FUNI are disclosed. The method broadly includes generating a DXI (FUNI) frame from the ATM layer OAM cell by using certain bits of the five byte ATM overhead as bits in the two byte DXI (FUNI) header, using the forty-eight byte ATM OAM cell payload as the payload for the DXI (FUNI) frame, and providing an indication in a predetermined bit field of the two byte DXI header that the forty-eight byte payload is an ATM OAM cell. Preferably, the predetermined bit field includes the previously reserved second lsb of Octet 1 of the DXI frame header, and the previously reserved third lsb of Octet 2 of the DXI frame header, which are set to values of "0" and "1" to indicate an ATM OAM cell, and to "0" and "0" to identify "regular" data.

20 Claims, 8 Drawing Sheets

AALx=AAL5 (OR OPTIONALLY AAL3/4)

APPARATUS AND METHOD FOR TRANSFERRING OPERATION, ADMINISTRATION AND MANAGEMENT CELLS ACROSS AND ATM DATA FRAME USER NETWORK INTERFACE

BACKGROUND OF THE INVENTION

1. Field of the Invention

The present invention relates generally to the field of telecommunications. More particularly, the present invention relates to operation, administration, and management (OAM) cells used across the User Network Interface (UNI) of an Asynchronous Transfer Mode (ATM) network.

2. State of the Art

Perhaps the most awaited, and now fastest growing technology in the telecommunication field in the 1990's is known as Asynchronous Transfer Mode (ATM) technology. ATM is providing a mechanism for removing performance limitations of local area networks (LANs) and wide area networks (WANs) and providing data transfers with at a speed of on the order of terabits/second. The variable length packets of LAN and WAN data are being replaced with ATM cells which are relatively short, fixed length packets. Because ATM cells can carry voice, video and data across a single backbone network, the ATM technology provides a unitary mechanism for high speed end-to-end telecommunications traffic.

In order for ATM technology to develop, it must be functional in its own right as well as compatible with existing technology. To be compatible, on the one hand, the ATM cells must be capable of receiving and accommodating voice, video, and LAN and WAN type data; while on the other hand, ATM cells must be capable of adapting to high speed technology such as the synchronous optical network (SONET). In order to meet these and other requirements, a technical group called the ATM Forum which is comprised of numerous corporate representatives has been proposing ATM "standards" which are being provided to ANSI and the ITU-T for their consideration and adoption. Details of those standards may be found in proceedings of the ATM Forum. Of particular interest among the ATM Forum documents is a document which is incorporated by reference in its entirety herein and which is dated Mar. 15, 1995 and entitled "af-saa-0030 000 Frame User-to-Network Interface (FUNI) Specifications", listing G. Shenoda and D. McDysan as editors. The Mar. 15, 1995 document incorporates therein the present invention which was described by one of the present inventors on Sept. 27, 1994 to the ATM Forum Technical Committee SAA/DX-UNI Sub-working Group. Of additional interest for the present invention are a Draft (11/94) ITU-T Recommendation I.610 entitled "B-ISDN Operation and Maintenance Principles and Functions", pp. 1–47; a Committee T1, Working Group T1S1.5 report dated Jul. 11–15, 1994 entitled "dpANS B-ISDN Operations and Maintenance principles and Functions", M. Methiwalla, editor, pp i-ix; an undated Draft ANSI standards document entitled "Broadband ISDN Operations and Maintenance Principles and Functions", Secretariat: Exchange Carriers Standards Association, (pp. 1–19), all of which are hereby incorporated by reference in their entireties herein. Additional background material on ATM is readily available, such as a booklet entitled "Asynchronous Transfer Mode: Bandwidth for the Future", published by Telco Systems, Inc., Norwood, Mass., and a pamphlet entitled "Tutorial-ATM in private Networking", published by Hughes LAN Systems, Mountainview, Calif.

As is set forth in Section 2 of Draft Recommendation I.610, operation, administration, and management (OAM) cells provide performance monitoring, defect and failure detection, system protection, defect information, and fault localization functions. performance monitoring is a function which processes user information to produce maintenance information specific to the user information. The maintenance information is added to the user information at the source of a connection/link and extracted at the sink of a connection/link. Analysis of the maintenance event information at the connection sink allows analysis of the transport integrity. Defect and failure detection is accomplished by continuous or periodic checking and results in the production of various alarms. In the system protection function, the effect of a defect on the transport of user information is minimized by blocking or changeover to other entities, and the failed entity is excluded from operation in order to protect the system. Defect information is given to other management entities. As a result, alarm indications are given to other management planes. Response to status report requests will also be given. Fault localization involves a determination by internal or external test systems of a failed entity if defect information is insufficient.

Section 3 of the 1.610Recommendation states that OAM functions in the network are performed at five OAM hierarchical levels associated with the ATM and physical Layers of the B-ISDN protocol reference model. The five hierarchical levels include: the virtual channel level which extends between network elements performing virtual channel connection termination functions, the virtual path level which extends between network elements performing virtual path connection termination functions, the transmission path level which extends between network elements assembling/disassembling the payload of a transmission system and associating it with its OAM functions, the digital section level which extends between section end points, and a regenerator section level which is a portion of a digital section. Of the five levels, the physical layer contains the regenerator section level, the digital section level, and the transmission path level, while the ATM layer contains the virtual path level and the virtual channel level. The OAM cells in the ATM layer virtual path level are called F4, while the OAM cells in the ATM layer virtual channel level are called F5. In the prior art, all ATM layer OAM cells are terminated at the ATM layer.

As is known by those skilled in the art, the ATM technology is based on the fifty-three byte ATM cell, with five bytes of overhead (i.e., a five byte header), and forty-eight bytes of data (which may include higher layer level overhead). The ratio of overhead to data is rather high for low speed applications. Thus, the ATM forum is developing an implementation agreement for a frame based user network interface (i.e., a frame UNI or FUNI) which passes frame information across the interface over variable sized frames between customer premises equipment (CPE) and an ATM switch. When information is passed across a FUNI, the frame can include up to approximately 64,000 bytes of user data. The format of the data is essentially in DXI frame format (now known as the FUNI format), with a start byte, a header, the user data, a trailer, and a stop byte. The DXI header contains ATM layer information (i.e., VPI/VCI) which is passed from the CPE to the switch, and vice versa. At the ATM switch, the DXI header and trailer are striped off, the DXI header is used to Generate an ATM cell header, and the adaptation data is used to segment or reassemble ATM cell data.

While it would be desirable to pass ATM layer OAM information across the FUNI to provide a complete end to end fault management and connectivity verification similar to the cell UNI, the F4 and F5 OAM cells cannot be passed through the FUNI as they are ATM layer cells and are terminated at the ATM layer level; i.e., they cannot be passed over a frame interface. Thus, for users utilizing a FUNI, AIS alarms, and loop-back commands cannot get to their CPE destination.

SUMMARY OF THE INVENTION

It is therefore an object of the invention to provide a mechanism for transferring ATM layer OAM information across a frame based user network interface so that a CPE can process, utilize, and act on the OAM information.

It is another object of the invention to provide a mechanism for placing ATM layer OAM information into a DXI (now FUNI) frame format with indicators for a CPE that OAM information is contained therein.

It is a further object of the invention to provide a simple mechanism for extending OAM features to end users, thereby permitting fault localization and continuity testing in a telecommunications system.

In accord with the objects of the invention, a method for transporting an ATM layer OAM cell across a FUNI broadly comprises generating a DXI (FUNI) frame from the ATM layer OAM cell, and providing an indication in the DXI (FUNI) frame that the frame contains OAM cell data. More particularly, the ATM layer OAM cell data is encapsulated with a DXI header and trailer in order to construct a DXI frame. The DXI header is preferably constructed with bits extracted from the OAM cell header, plus an indication in predetermined bit fields which permits the CPE to distinguish the DXI frame containing OAM cell data from other DXI data frames. In accord with a preferred embodiment of the invention, the previously reserved second bit of Octet 1 of the DXI frame header is set to a value "1", while the previously reserved third bit of Octet 2 of the DXI frame header is set to a value "0" in order to signal that an OAM cell is being contained in the DXI (FUNI) frame. The same bits are set to values "0" and "0" in order to identify user data information (i.e., a typical DXI frame). In accord with a preferred aspect of the invention, one OAM cell is encapsulated in a single DX1 frame having a payload of forty-eight bytes. The five byte header of the OAM cell is removed prior to encapsulation, with the information contained in the OAM cell overhead being used to fill fields in the DXI header.

The objects and advantages of the invention will become apparent to those skilled in the art upon reference to the detailed description taken in conjunction with the provided figures.

BRIEF DESCRIPTION OF THE DRAWINGS

FIG. 1b is a prior art diagram illustrating the layers associated with different parts of the network shown in FIG. 1a.

DETAILED DESCRIPTION OF THE PREFERRED EMBODIMENT

Figure 1A:
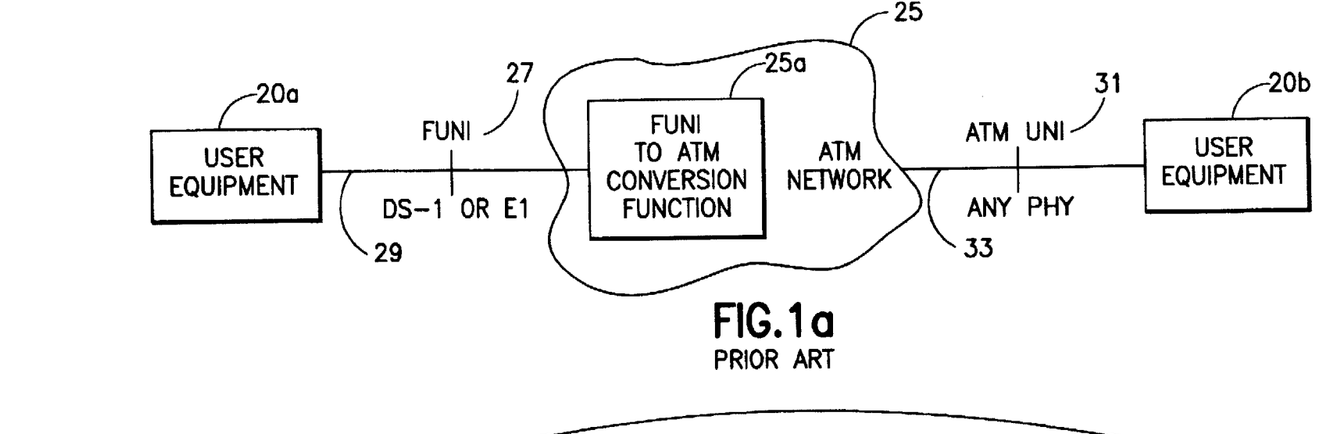
FIG. 1a is a prior art schematic diagram of a telecommunications network with ATM UNI and FUNI interfaces.

Turning to prior art FIG. 1a, a telecommunications network 10 is seen to include user equipment (CPE) 20a, 20b, and a switched public network 25. The user equipment 20a is shown coupled to the public network 25 via a frame based user network interface (FUNI) 27, utilizing a DS-1 or E1 physical line 29. The user equipment 20b, on the other hand, is shown coupled to the public network 25 via a cell-based ATM user network interface 31, using any physical line 33. In order for the network 25 (shown as an ATM network) to support the FUNI, the network provides a FUNI to ATM conversion function 25a which was discussed above in the background section.

Figure 1B:
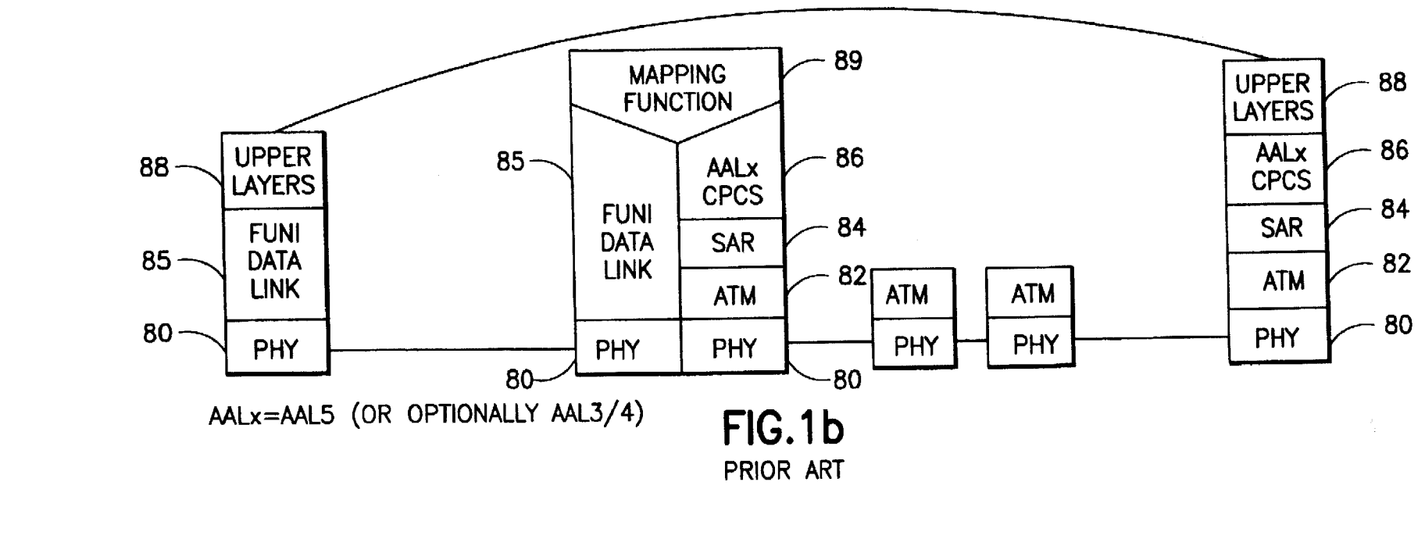

The layers supported by the user equipment 20a, 20b, and the network 25 are seen in prior art FIG. 1b. Thus, the cell based user equipment 20b is provided with a physical layer 80, the ATM layer 82, an adaptation AALx/SAR segmentation and reassembly sublayer 84, an adaptation layer AALx/CPCS 86, and appropriate upper layers 88 such as TCP/IP layers. The frame based user equipment 20a, on the other hand, simply includes the physical layer 80, the FUNI data link layer 85, and upper layers 88. The network 25 is shown to perform a mapping function 89 between the layers 80, 82, 84, 86 of the cell based user equipment 20b, and the layers 80, 85 of the frame based user equipment 20a.

Figure 2A:
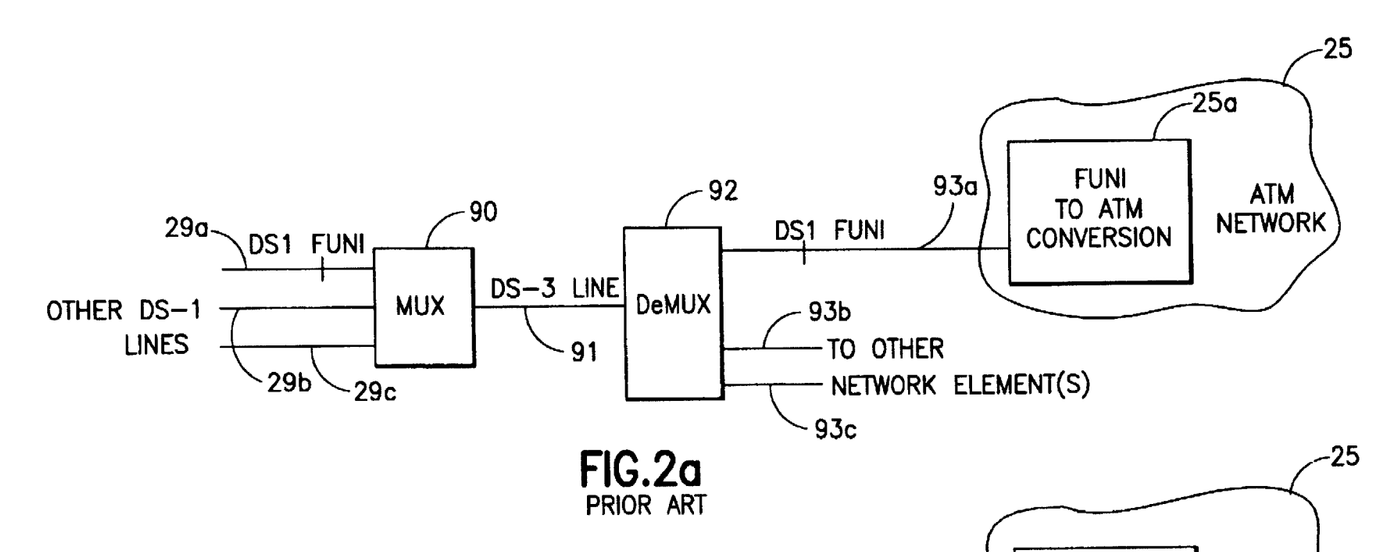
FIG. 2a is a prior art block diagram for the multiplexing/grooming of a DS-1 FUNI.

It will be appreciated by those skilled in the art that an ATM connection between the user equipment and the network may be a logical connection which is part of a high bandwidth physical connection. Thus, as shown in prior art FIG. 2a, data from a plurality of DS-1 lines 29a, 29b, 29c (line 29c being utilized as a FUNI for the ATM network) are multiplexed at multiplexer 90 onto a DS-3 line 91. The data on the DS-3 line 91 is in turn demultiplexed by a demultiplexer 92 onto a DS-1 groomed ATM line 93a which is coupled to the ATM network 25, and onto additional lines 93b, 93c which are coupled to other network elements (not shown).

Figure 2B:
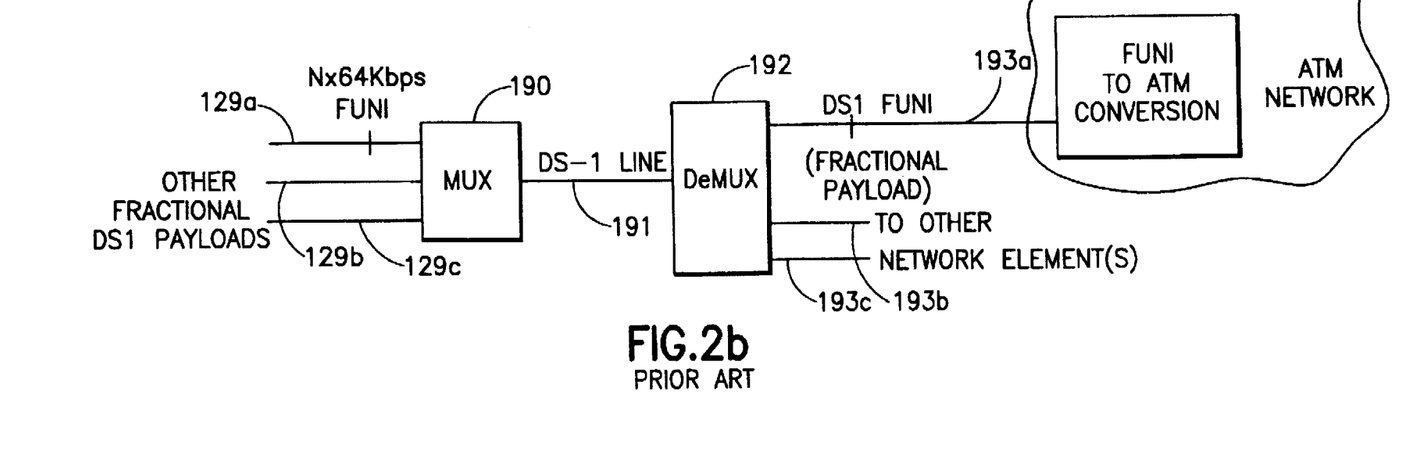
FIG. 2b is a prior art block diagram for the multiplexing/grooming of a fractional DS-1 FUNI.

A fractional DS-1 (or E1) FUNI payload may be similarly carried in a DS-1 (or E1) physical connection. A fractional DS-1 FUNI payload is particularly useful for users who wish to transfer information at low speeds, e.g., voice, in the same DS-1 physical connection to the network. Thus, as shown in FIG. 2b an Nx64K bps CPE (not shown) is coupled via line 129a, along with other fractional DS1 payloads on lines 129b, 129c to a multiplexer 190 which outputs the data on a DS-1 line 191. The data on line 191 is then demultiplexed to provide a fractional payload on a DS-1 groomed FUNI line 193a, as well as fractional payloads on lines 193b, 193c coupled to other network elements (not shown).

Figure 3:
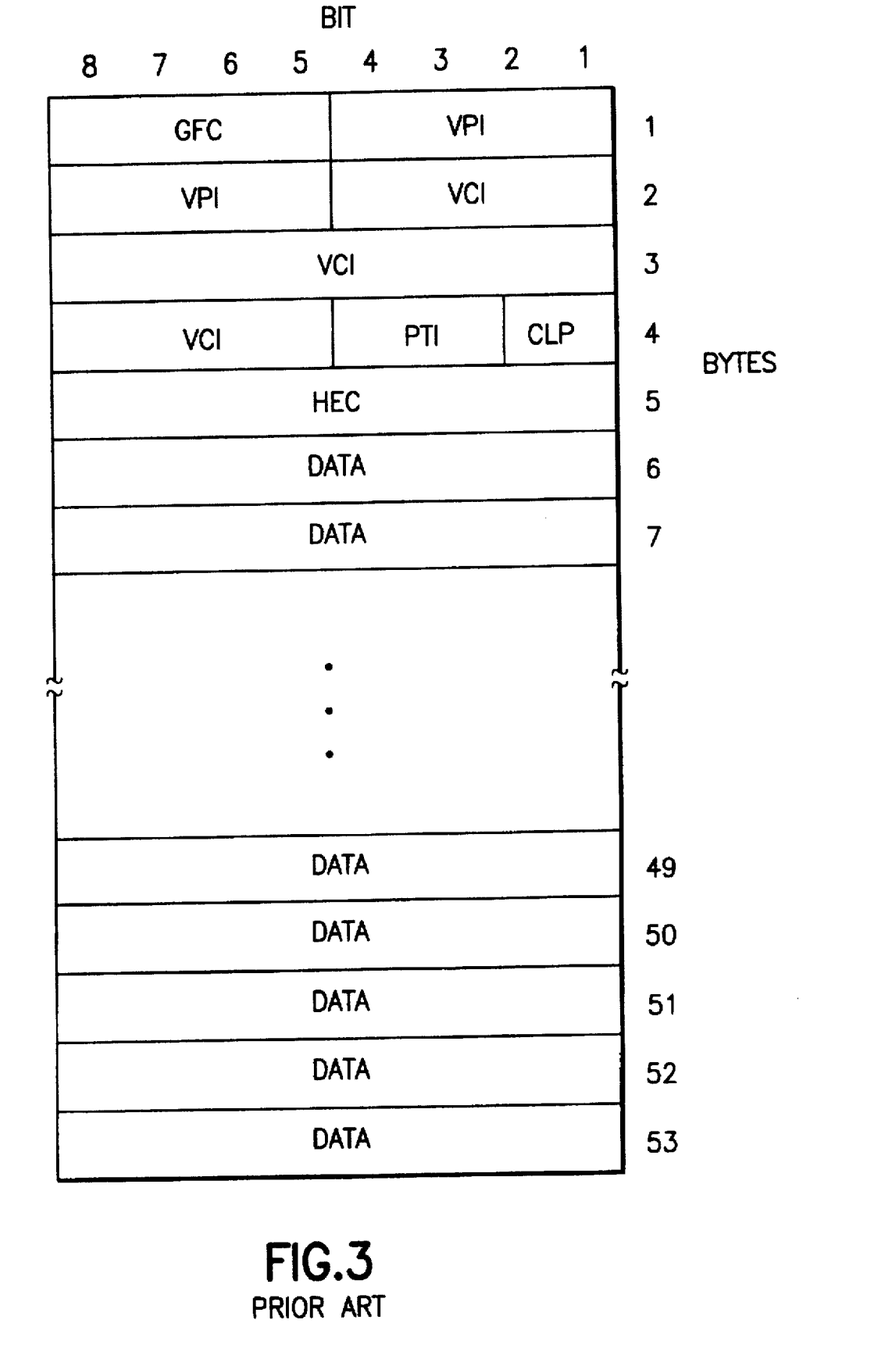
FIG. 3 is a prior art diagram of the ATM cell header format across the user network interface.

Details of the ATM cell format on the ATM side of the user network interface are seen in prior art FIG. 3. The ATM cell has a five byte cell header and forty-eight bytes of data. The first byte of the header includes four bits of generic flow control (GFC), and four bits of a virtual path indicator (VPI).

The second byte of the header includes four additional bits of the VPI and four bits of a virtual channel identifier (VCI). The third byte of the header has eight additional bits of the VCI, while the fourth byte of the header has four additional bits of the VCI, three bits of a payload type indicator (PTI), and a one bit cell loss priority indicator (CLP). The fifth byte of the header is a header error control (HEC). It should be appreciated by those skilled in the art that the F4 and F5 OAM cells take the ATM cell format shown in FIG. 3 with predefined VCI and PTI field values.

Figure 4:
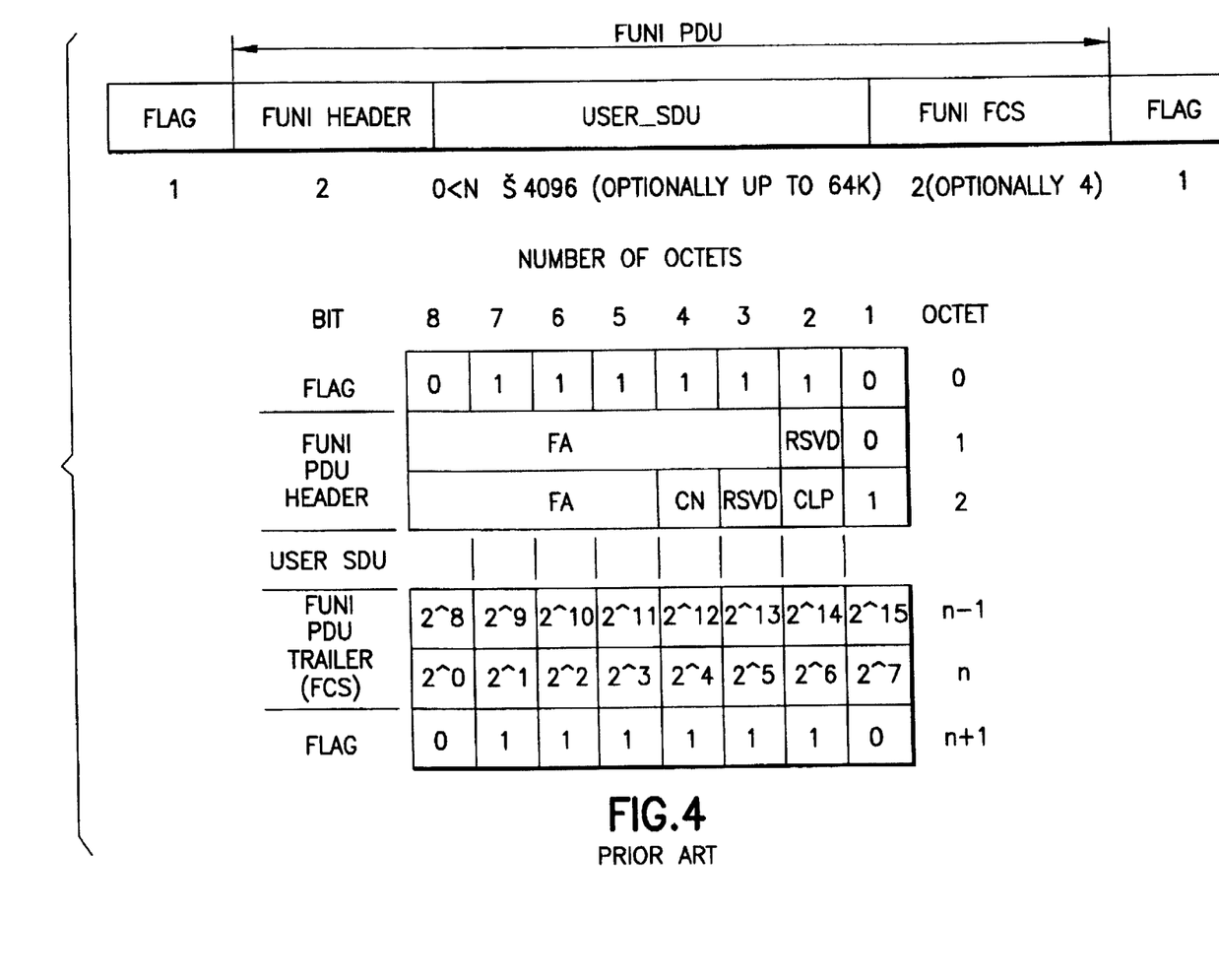
FIG. 4 is a prior art diagram illustrating the frame structure across the FUNI.

Details of the DXI (now FUNI) frame format on the frame (FUNI) side of the user network interface are seen in prior art FIG. 4. The DXI or FUNI frame includes a start flag byte, two bytes of a DXI or FUNI header, up to 64,000 bytes of payload data, two to four bytes of a DXI or FUNI trailer, and a stop flag byte. As indicated in FIG. 4, the start and stop flag bytes are preferably of the form "01111110". The first byte of the DXI or FUNI frame header includes six bits of a frame address, an undefined one bit field, and an lsb set to "0". The second byte of the DXI or FUNI frame header includes four additional bits of a frame address, a congestion notification bit CN, an undefined one bit field, a CLP bit, and an lsb set to "1". The DXI or FUNI trailer is a frame check sequence which may be a sixteen or thirty-two bit CRC depending upon the length of the data string.

Figure 5:
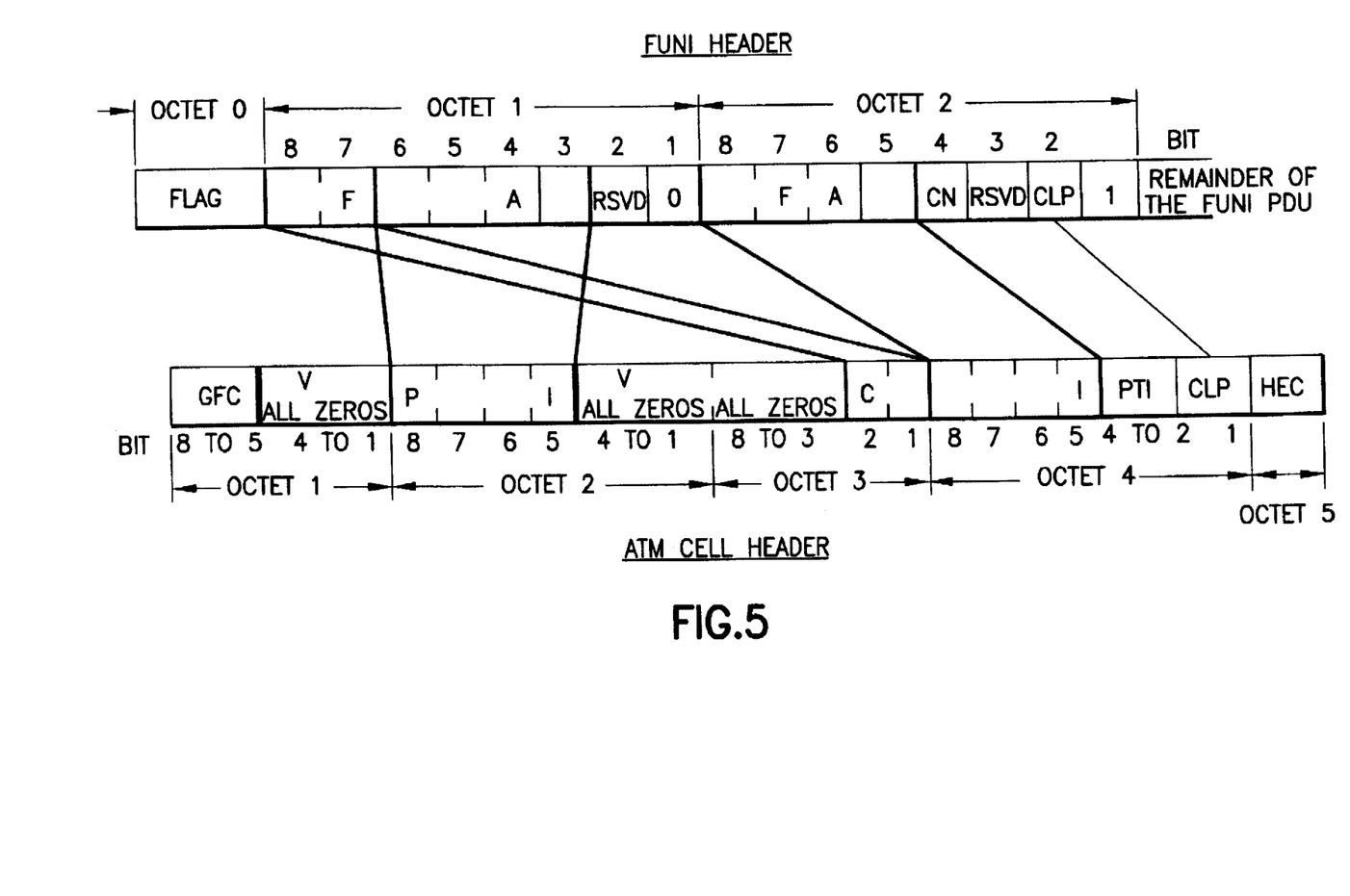
FIG. 5 is a diagram illustrating the maping between the FA field of a FUNI header and the VPI/VCI fields of an ATM cell header.

In order for ATM data to be transmitted across a FUNI, the ATM cell header, and the AALx sublayer header and trailer are striped off. In addition, the ATM cells must be terminated at the AAL layer, and the data carried in the ATM cell must be placed into a DXI (FUNI) type frame. The number of ATM cells which are placed into and which constitute the payload of the DXI frame is provided by the AAL layer. However, regardless of the number of ATM cells which constitute the larger frame, certain bits of the ATM cell header (seen in FIG. 3) must be mapped into certain of the bits of the DXI or FUNI header (seen in FIG. 4). In particular, and as seen in prior art FIG. 5, the two lsbs of the third byte of the ATM cell header are mapped into the two msbs of the first byte of the DXI or FUNI header; the four msbs of the second byte of the ATM cell header are mapped into the four next msbs of the first byte of the DXI or FUNI header; the four msbs of the fourth byte of the ATM cell header are mapped into the four msbs of the second byte of the DXI or FUNI header; and the lsb (CLP) of the fourth byte of the ATM cell header is mapped into the second lsb (CLP) of the second byte of the DXI or FUNI header. Additional details of the prior art mapping may be seen by reference to the "af-saa-0030 000 Frame User-to Network Interface (FUNI) Specifications" document previously incorporated by reference herein, and the documents incorporated in that document.

It should be appreciated by those skilled in the art, that in the prior art arrangement, any OAM cells which would be received at the FUNI would be terminated at the ATM OAM layer. Indeed, no mechanism is provided in the prior art to transmit the OAM cells across the FUNI. However, according to the present invention, OAM cells may be transmitted across the FUNI by placing the OAM information into a DXI (FUNI) frame format with indicators in the DXI (FUNI) header that OAM information is contained therein. In particular, and as set forth in flow chart form in FIG. 6, rather than terminating the OAM cell, the ATM switch maps the OAM ATM cell header into the DXI (FUNI) header at 202 as discussed above with reference to FIG. 5. At 204, the second lsb of the first byte and the third lsb of the second byte of the DXI header are set to a predetermined value (e.G., "1", "0"). At 206, the forty-eight bytes of the OAM cell are placed into a single DXI or FUNI frame as a DXI (FUNI) payload. At 208, the DXI or FUNI trailer (checksum) is calculated and placed in the frame; and at 210, start and stop flags are appended. With the OAM cell now formed as a DXI (FUNI) data frame, the OAM cell is passed at 212 across the FUNI to the CPE. At 214, the CPE decodes the second lsb of the first byte and the third lsb of the second byte of the DXI (FUNI) header. If those bits are set to the predetermined value (e.g., "1", "0"), the CPE determines that the DXI (FUNI) frame includes an OAM cell, and treats the OAM "data" accordingly. If those bits are set to other values, (e.g., "0", "0"), the CPE determines that the DXI (FUNI) frame is comprised of "regular" data, and processes that data accordingly.

Figure 7:
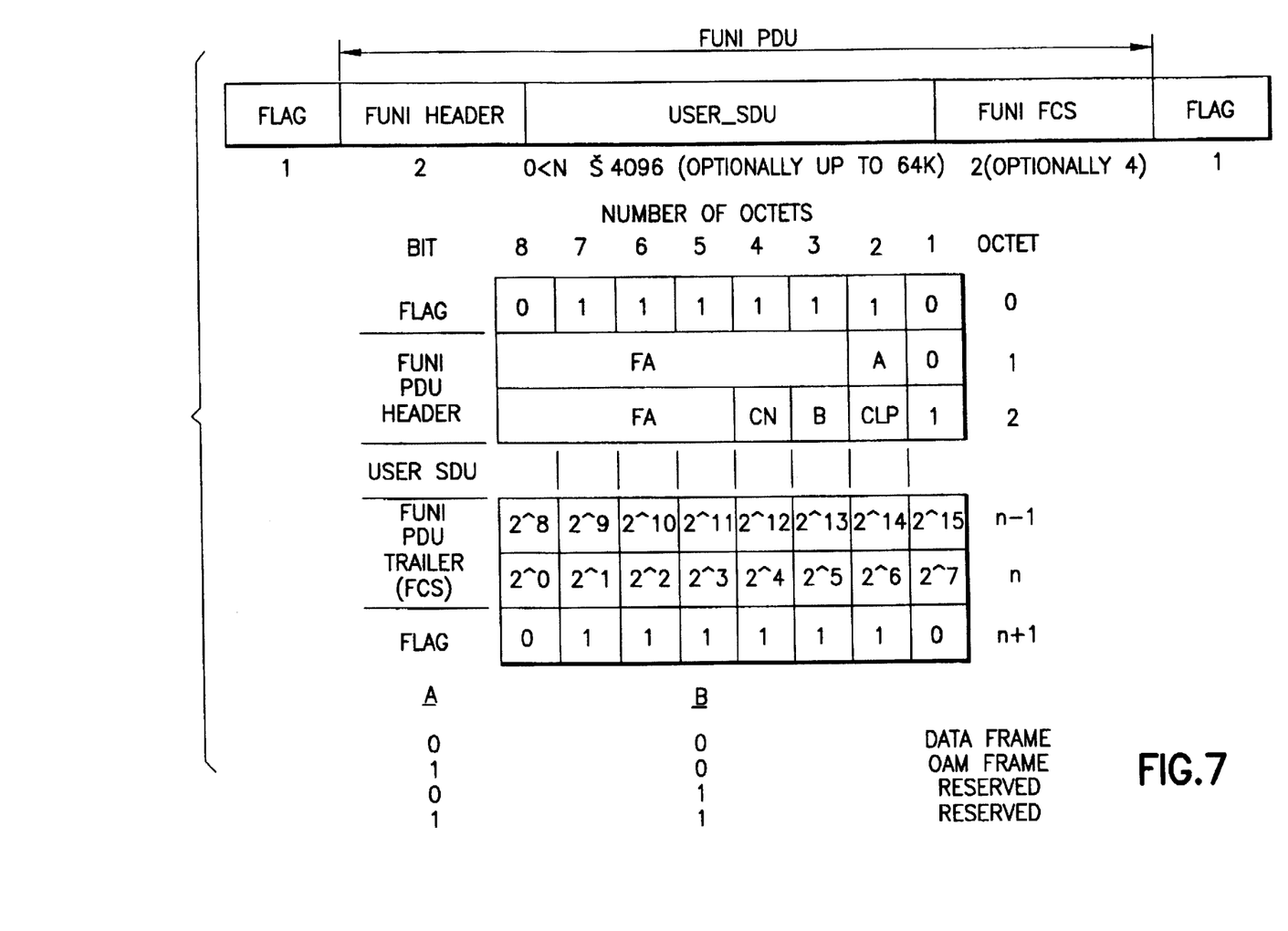
FIG. 7 is a modified diagram illustrating the frame structure across the FUNI according to the invention.

Because the mechanism of the invention utilizes the previously undefined bits of the DXI header, the DXI header for the FUNI is effectively changed. Thus, as seen in FIG. 7 (and compring with FIG. 4), the second lsb of the first byte of the FUNI header is indicated by "A", and the third lsb of the second byte of the FUNI header is indicated by "B". In accord with the preferred embodiment of the invention, in order to indicate an OAM cell, bit A is set to "1", while bit B is set to "0". On the other hand, where a data frame is to be sent across the FUNI, bit A is set to "0", and bit B is set to "0". The other two combinations, bit A set to "0"-bit B set to "1", and bit A set to "1" and bit B set to "1" are preferably reserved for future use. It should be appreciated that whether or not the FUNI header contains data as opposed to an OAM cell can be signalled by the use of a single bit. Indeed, in the best mode provided, it is effectively the second lsb of the first byte of the FUNI header (the "A" bit) which is indicating what is contained in the FUNI frame, as the third lsb of the second byte of the FUNI header (the "B" bit) is set to zero in both cases.

Figure 6:
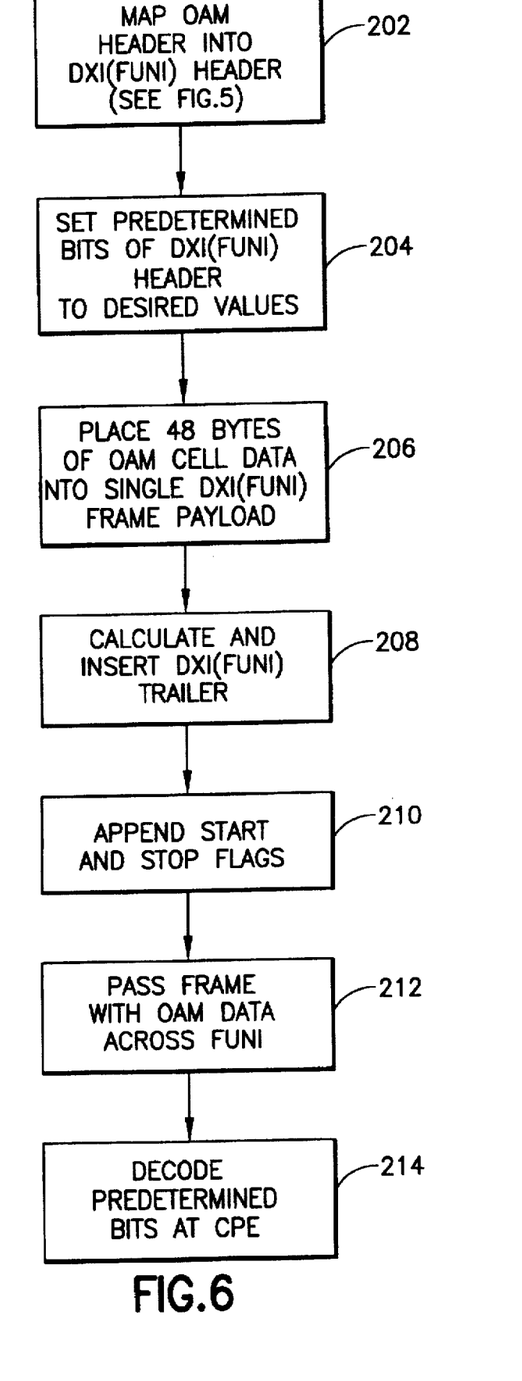
FIG. 6 is a flow chart of the method of the invention for converting an OAM ATM cell into a DXI type frame.
Figure 8:
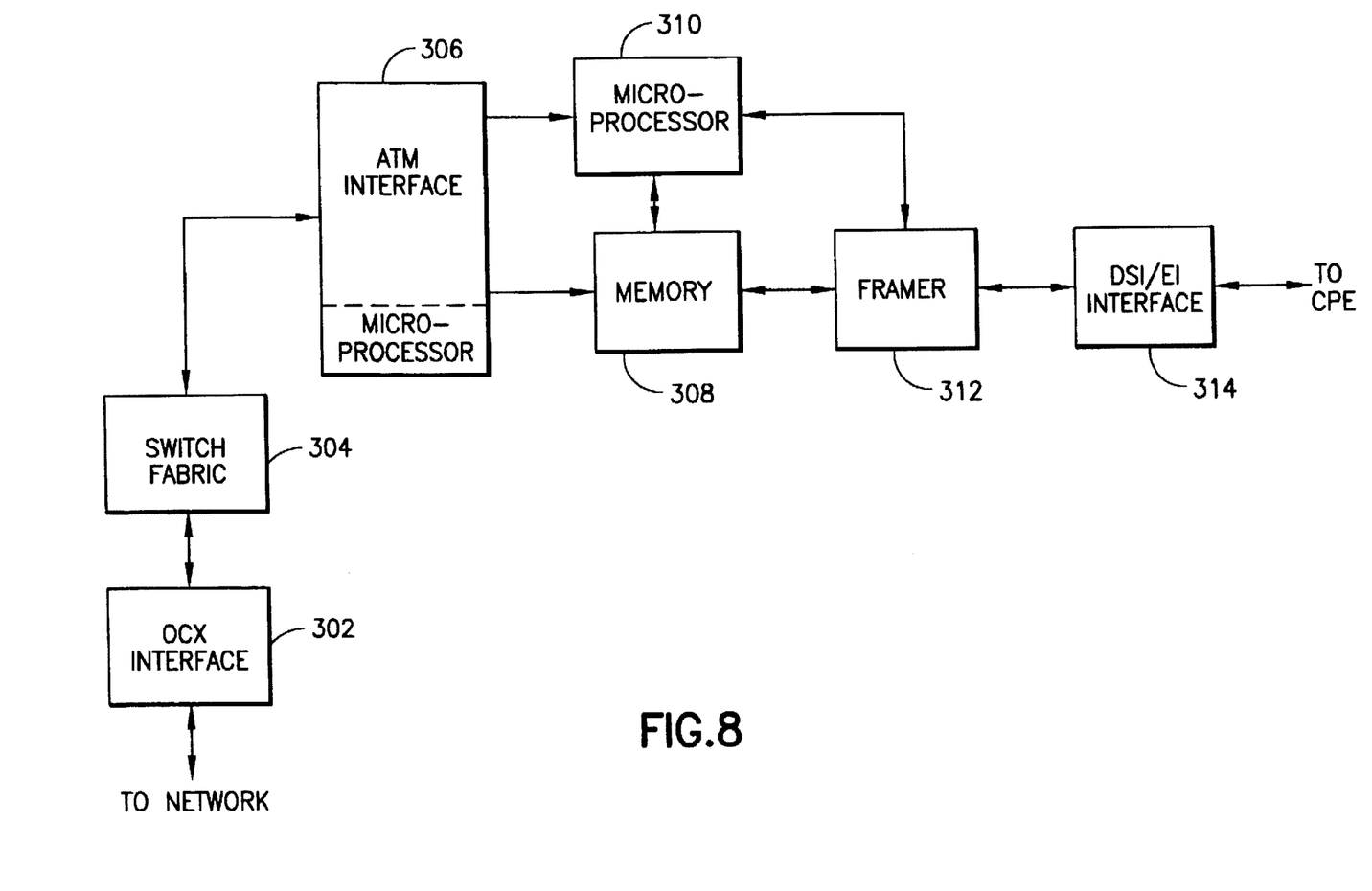
FIG. 8 is a high level block diagram of the switch which maps a management cell into a DXI frame in accord with the invention.

Turning now to FIG. 8, a block diagram of an apparatus 25a (at the switch) which generates the FUNI frame from the OAM cell in accord with the flow chart of FIG. 6 is seen. As seen in FIG. 8, the apparatus 25a includes an OCx interface 302, a switch fabric 304, an ATM interface 306, memory 308, a microprocessor 310, a framing processor 312, and a DS1/E1 interface 314. Thus, ATM data which is carried in a SONET frame and which is received from the optical network over OCx physical optical lines, is provided to the OCx interface where the SONET overhead is typically striped. After being switched in the switch fabric 304, the ATM data is provided to the ATM interface or slot controller 306 (details of which may be seen with reference to commonly owned U.S. Pat. No. 5,436,893 to Barnett) which includes its own microprocessor. The ATM interface 306 terminates the ATM cell, forwards the ATM cell data and at least certain of the overhead bytes into memory 308, and flags the microprocessor 310. The microprocessor 310, upon receiving an indication that an ATM cell (or cells) has been received, uses the data and overhead information which has been forwarded into memory (including certain AALx overhead), and maps the ATM cell or cells into a DXI or FUNI type frame. In particular, the microprocessor 310 generates a DXI (FUNI) header from the ATM cell and AALx overhead and either provides the header directly to the framer processor 312, or writes the header to the memory 308 and flags the framer processor to indicate that the header is available in memory 308. In turn, the framer 312 takes the data from the memory 308 (and the microprocessor 310), generates a DXI or FUNI checksum (CRC) trailer which is appended to the data, and provides start and stop bytes. The DXI (FUNI) frame which is formed in that manner is then forwarded to the DS1/E1 interface 314 which generates the appropriate overhead bytes for the DS1 or E1 format so that the FUNI frame can be forwarded over a DS1 or E1 line to the CPE 20a (see FIG. 1).

Based on FIGS. 6-8, those skilled in the art should appreciate that OAM cells received by the switch are effectively filtered at the ATM layer and sent to the OAM layer. The OAM layer of the switch can then either utilize and terminate the information received in the OAM cells (if they are not intended for the CPE), or can pass the OAM cells transparently to the OAM-to-FUNI mapping process which will put the forty-eight bytes of payload from the OAM cell into exactly one DXI (FUNI) frame payload. The mapping process of the DXI header from the OAM cell header is described above with reference to FIGS. 5-7. In passing the OAM cells to the OAM-to-FUNI mapping process, the AAL layer is preferably bypassed completely and not used in the OAM information transfer. At the CPE, the DXI (FUNI) frame payload is extracted and provided the CPE layer that processes the OAM information.

There has been described and illustrated herein an apparatus and method for transferring OAM cells across an ATM data frame user network interface (FUNI). While particular embodiments of the invention have been described, it is not intended that the invention be limited thereto, as it is intended that the invention be as broad in scope as the art will allow and that the specification be read likewise. Thus, while a particular high level circuit for the switch which generates the DXI frame from the OAM cell was shown, it will be appreciated that other circuits could be utilized. Also, while particular preferred bit values for the second lsb of the first byte and the third lsb of the second byte of the DXI header were described as indicating an OAM cell, it will be appreciated that only one bit need be utilized to distinguish "regular" data from OAM data, and that the single bit could be either the second lsb of the first byte or the third lsb of the second byte of the DXI header as desired. It will therefore be appreciated by those skilled in the art that yet other modifications could be made to the provided invention without deviating from its spirit and scope as so claimed.

We claim:

1. A method of transporting an asynchronous transfer mode (ATM) layer operation, administration, and management (OAM) cell across a frame based user network interface (FUNI), the ATM OAM cell having a first five byte header and forty-eight bytes of data, said method comprising:

generating a FUNI frame at least partially from the ATM layer OAM cell, said FUNI frame having a second header having at least two bytes, a trailer, and a data payload portion, said data payload portion of said FUNI frame including said forty-eight bytes of data of said ATM OAM cell, and said second header including selected information from said first five byte header of said ATM OAM cell and an indicator that said FUNI frame contains OAM cell data.

2. A method according to claim 1, wherein:

a first byte of said second header includes two bits from a third byte of said first five byte ATM OAM cell header and four bits from a second byte of said first five byte ATM OAM cell header, and a second byte of said second header includes five bits from a fourth byte of said first five byte ATM OAM cell header, and said indicator comprises at least one bit in a field located in at least one of said first and second bytes of said second header.

3. A method according to claim 2, wherein:

said field is located in at least the sixth most significant bit of said second byte of said second header, and said indicator comprises a first predetermined value for the sixth most significant bit of said second byte of said second header.

4. A method according to claim 3, wherein:

said field is additionally located in said seventh most significant bit of said first byte of said second header, and said indicator further comprises a second predetermined value for the seventh most significant bit of said first byte of said second header.

5. A method according to claim 3, wherein:

said first predetermined value is a "1".

6. A method according to claim 4, wherein:

said first predetermined value is a "1", and said second predetermined value is a "0".

7. A method according to claim 1, wherein:

said data payload portion of said FUNI frame consists of said forty-eight bytes of data of said ATM OAM cell.

8. A method according to claim 1, wherein:

said FUNI frame includes a start byte and a stop byte, and said trailer comprises a frame check sequence.

9. A method according to claim 1, further comprising:

transporting said FUNI frame from an ATM cell switch to a user's equipment via a DS-1 or E1 physical line.

10. A method of passing an asynchronous transfer mode (ATM) layer operation, administration, and management (OAM) cell from an ATM switch across a frame based user network interface (FUNI) to a customer premises equipment (CPE) over an E1 or DS-1 physical line, the ATM OAM cell having a five byte ATM header and forty-eight bytes of ATM payload data, said method comprising:

a) in said ATM switch, generating a FUNI frame by
 i) mapping information from said five byte ATM header into a header of said FUNI frame, said FUNI frame header comprising at least two bytes;
 ii) setting at least one bit of a bit field in said FUNI frame header to a predetermined value;
 iii) placing said forty-eight bytes of ATM payload data into a payload of a FUNI frame, said FUNI frame payload having forty-eight bytes;
 iv) calculating a checksum value for said FUNI frame header and FUNI frame payload, and using said checksum value in generating a FUNI frame trailer;
 v) apending a start flag to said FUNI frame header and a stop flag to said FUNI frame trailer;
b) passing said FUNI frame with said FUNI frame header, said FUNI frame payload, said FUNI frame trailer, and said start and stop flags from the ATM switch across the FUNI to the CPE.

11. A method according to claim 10, wherein:

a first byte of said FUNI frame header includes two bits from a third byte of said five byte ATM OAM cell header and four bits from a second byte of said five byte ATM OAM cell header, and a second byte of said FUNI frame header includes five bits from a fourth byte of said five byte ATM OAM cell header, and said bit field comprises at least the sixth most significant bit of said second byte of said FUNI frame header.

12. A method according to claim 11, wherein:

said bit field additionally comprises the seventh most significant bit of said first byte of said FUNI frame header.

13. A method according to claim 11, wherein:

said sixth most significant bit of said second byte of said FUNI frame header is set to a value "1" to indicate an OAM cell contained in said FUNI frame payload.

14. A method according to claim 12, wherein:

said sixth most significant bit of said second byte of said FUNI frame header is set to a value "1", and said seventh most significant bit of said first byte of said FUNI frame header is set to a value "0" to indicate an OAM cell contained in said FUNI frame payload.

15. A method according to claim 10, wherein:

said FUNI frame is passed directly from the ATM switch across the FUNI to the CPE and bypasses AAL layers of the ATM switch.

16. In an asynchronous transfer mode (ATM) switch, an apparatus for passing an ATM layer operation, administration, and management (OAM) cell across a frame based user network interface (FUNI) to a customer premises equipment (CPE) over an E1 or DS-1 physical line, the ATM OAM cell having a five byte ATM header and forty-eight bytes of ATM payload data, said apparatus comprising:

a) ATM interface means for receiving and terminating said ATM OAM cell;

b) processor means having an associated memory and coupled to said ATM interface means, said processor means for mapping certain bits of said five byte ATM header into a FUNI frame header having at least two bytes, for generating an indicator in a bit field of said FUNI frame header as to whether said ATM payload data contains an OAM cell, for mapping said forty-eight bytes of ATM payload data into a FUNI frame data payload, and for generating a FUNI frame trailer; and c) line interface means coupled to said processor means for placing said FUNI frame into an E1 or DS-1 format, and for transmitting said so-formatted FUNI frame onto a respective E1 or DS-1 line.

17. An apparatus according to claim 16, wherein:

a said processor means includes frame means for generating said FUNI frame trailer from a checksum of said FUNI header and said FUNI frame data payload, and for appending a start flag to said FUNI frame header and a stop flag to said FUNI frame trailer.

18. An apparatus according to claim 16, wherein:

a first byte of said FUNI frame header includes two bits from a third byte of said five byte ATM OAM cell header and four bits from a second byte of said five byte ATM OAM cell header, and a second byte of said FUNI frame header includes five bits from a fourth byte of said five byte ATM OAM cell header, and said bit field includes at least one of i) the sixth most significant bit of said second byte of said FUNI frame header, and ii) the seventh most significant bit of said first byte of said FUNI frame header.

19. An apparatus according to claim 18, wherein:

said bit field includes both of said sixth most significant bit of said second byte of said FUNI frame header and the seventh most significant bit of said first byte of said FUNI frame header.

20. An apparatus according to claim 18, wherein:

said processing means sets said sixth most significant bit of said second byte of said FUNI frame header to a value "1" when said FUNI frame data payload contains an ATM OAM cell.

\* \* \* \* \*